Sept. 29, 1925.
J. G. BLUNT ET AL
1,555,262
VALVE GEAR
Filed July 3, 1922
2 Sheets-Sheet 1
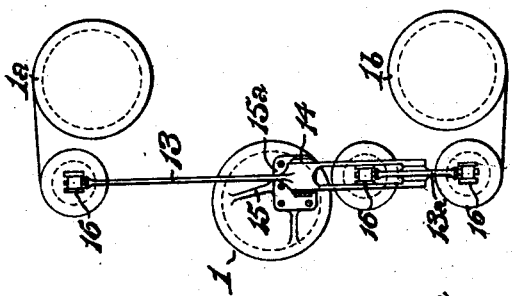
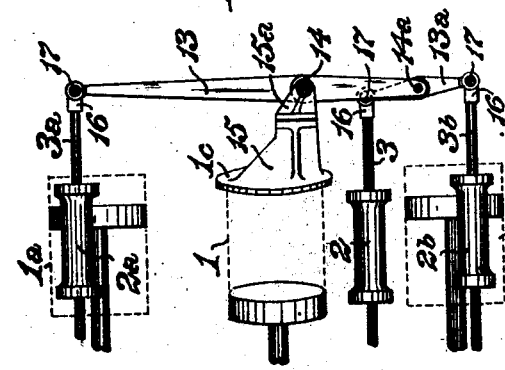
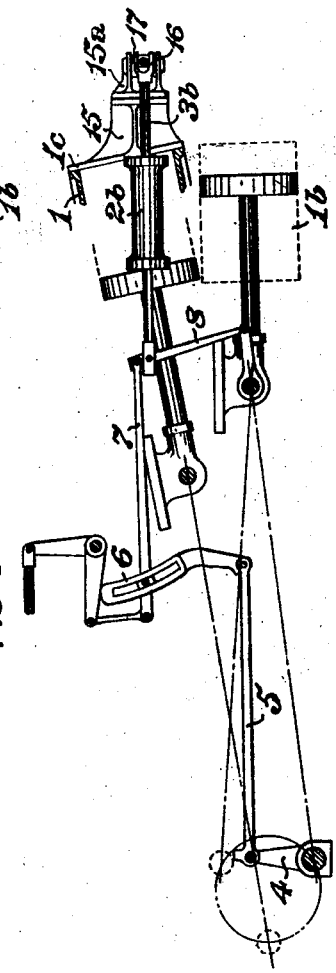
WITNESSES
INVENTORS Sept. 29, 1925. 1,555,262
J. G. BLUNT ET AL
VALVE GEAR
Filed July 3, 1922 2 Sheets-Sheet 2
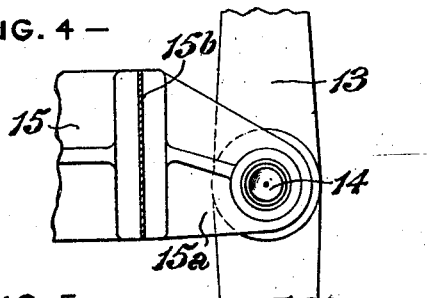
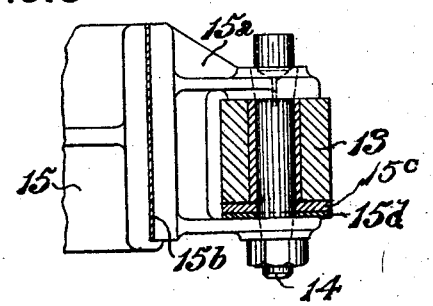
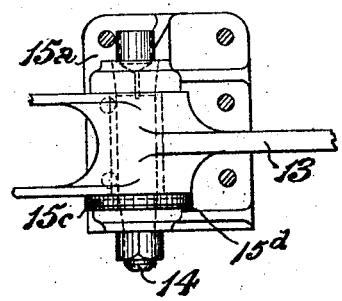
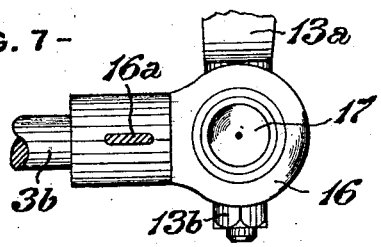
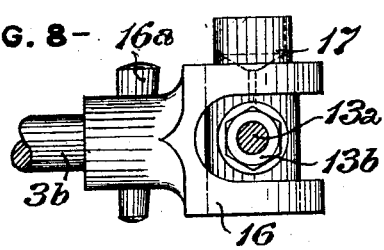
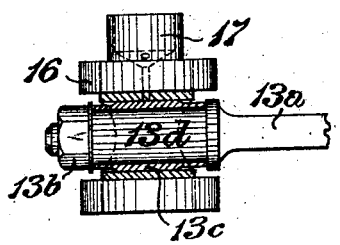
WITNESSES
INVENTORS Patented Sept. 29, 1925.

1,555,262

UNITED STATES PATENT OFFICE.

JAMES G. BLUNT AND JOSHUA J. JONES, OF SCHENECTADY, NEW YORK.

VALVE GEAR.

Application filed July 3, 1922. Serial No. 572,626.

*To all whom it may concern:*

Be it known that we, JAMES G. BLUNT and JOSHUA J. JONES, both of Schenectady, in the county of Schenectady and State of New York, have jointly invented a certain new and useful Improvement in Valve Gears, of which improvement the following is a specification.

Our invention relates to valve gears for three cylinder fluid pressure engines, and is an improvement on that for which Letters Patent of the United States No. 946,083 were granted and issued to Harry S. Vincent, under date of January 11, 1910. As in the valve gear of said Letters Patent, the movements of the distribution valve of the central cylinder are derived from a combination of the motions of the distribution valves of the two outer cylinders by which a correct resultant motion for the distribution valve of the central cylinder is obtained.

The object of our invention is to provide a valve gear of the type above specified which will be of simple and inexpensive construction, and in which the original setting and necessary periodic adjustments of the distribution valve of the central cylinder may be accurately effected.

The improvement claimed is hereinafter fully set forth.

In the accompanying drawings: Figure 1 is a side view, in elevation, of a valve gear embodying our invention; Fig. 2, a plan or top view; Fig. 3, an end view; Fig. 4, a plan view of the outer portion of the lever supporting appliance of the central cylinder; Fig. 5, a side view, partly in section, of the same; Fig. 6, an outer end view; Fig. 7, a plan view of the knuckle connection of one of the side cylinder distribution valve stems; Fig. 8, a side view of the same; and, Fig. 9, an outer end view, partly in section.

Our invention is, as in Letters Patent No. 946,083 aforesaid, herein exemplified as applied in a three cylinder single expansion locomotive engine, having a central cylinder, 1, and two side cylinders, $1^a$, $1^b$, in which locomotive the distribution valves, $2^a$, $2^b$, of the two outer cylinders, $1^a$, $1^b$, are actuated by ordinary Walschaerts valve gears, each of which comprises an eccentric crank, 4, eccentric rod, 5, link, 6, radius bar, 7, and lap and lead lever, 8, to which gears, the valve stems, $3^a$, $3^b$, of the valves, $2^a$, $2^b$, are connected, in the usual manner.

In the practice of our invention, referring descriptively to the specific embodiment thereof which is herein exemplified, the distribution valves, $2^a$, $2^b$, of the two outer or side cylinders, $1^a$, $1^b$, are reciprocated, in the usual manner, by the valve mechanism above described, or by any similarly operating known and preferred valve gear, and the resultant of their movements is imparted to the distribution valve, 2, of the central cylinder, 1, by two transversely extending double armed levers, 13 and $13^a$, a longer and a shorter one, to which all three of the valve stems, 3, $3^a$, $3^b$, are connected. The arms of the longer lever, 13, are of unequal length, and the longer arm is coupled, by a knuckle construction hereinafter described, to the stem of the distribution valve of one of the outer cylinders, in this instance, the valve stem, $3^a$. The lever, 13, is itself coupled, by a pin, 14, to a lever support, $15^a$, secured to a bracket, 15, which is formed integral with the forward head, $1^c$, of the central cylinder, 1. The shorter lever, $13^a$, is coupled, at the middle of its length, by a pin, $14^a$, to the shorter arm of the lever, 13, and its arms are coupled, by knuckle constructions similar to that at the end of the longer arm of the lever, 13, to the valve stem, 3, of the central cylinder, and, in this instance, to the valve stem, $3^b$, respectively.

It is a well recognized fact, that in order to avoid leaks and undue wear, the valves should be reciprocated on straight lines, and as the ends of the levers, 13 and $13^a$, necessarily move in slightly curved paths, in order to avoid the objections of applying intermediate links between the levers and valve stems, the valve stems are coupled to the levers by knuckle constructions, which are shown in Figs. 7, 8 and 9. A jaw, 16, is secured to the outer end of each of the valve stems 3, $3^a$ and $3^b$, as by a key, $16^a$, and is drilled vertically to receive a pin, 17, which is drilled horizontally to receive a cylindrical bearing, $13^d$, formed on an end of the lever, 13 or $13^a$, as the case may be, to which the valve stem is coupled. A removable bushing, $13^c$, is preferably fitted on the bearing, $13^d$, and undesired detachment of the lever from the pin, 17, is prevented by a nut, $13^b$, engaging a thread on the end of the lever. The pin, 17, is held in the jaw, 16, by its engagement with the lever, 13 or $13^a$. It will be seen that the freedom of movement in two directions, afforded by the knuckle construction, obviates interference with the normal straight reciprocating movements of the valve stem.

It is well known to those skilled in the art of locomotive construction, that extreme accuracy is required in fitting valve gears to avoid errors in the setting of the valve of the central cylinder, and that after setting, periodic adjustments are required by reason of unavoidable wear of bearings, etc. To facilitate the original setting and periodic adjustments, as well as to provide a firm and conveniently located support for the levers, the supporting bracket, 15, has been made integral with the front head, $1^c$, of the central cylinder, 1, and the lever support proper, $15^a$, Figs. 4, 5 and 6, is connected detachably thereto. Horizontal adjustments may be readily and accurately made by the insertion of liners, $15^b$, of proper thickness, between the bracket and lever support, and vertical adjustments may be effected by the insertion of liners, $15^d$, between a shoe, $15^c$, interposed between the bottom of the lever and the lower jaw of the lever support, $15^a$.

We claim as our invention and desire to secure by Letters Patent:

1. In a three cylinder fluid pressure engine, having one central and two side cylinders, the combination of the distribution valve stems of said cylinders; vibratory levers, connecting said valve stems; and means for supporting said levers on the forward head of the central cylinder.

2. In a three cylinder fluid pressure engine, having one central and two side cylinders, the combination of the distribution valve stems of said cylinders; vibratory levers, connecting said valve stems; means for supporting said levers on the forward head of the central cylinder; and means for taking up vertical and horizontal wear between said supporting means and the lever carried thereon.

3. In a three cylinder fluid pressure engine, having one central and two side cylinders; the combination of the forward head of the central cylinder; and a lever supporting bracket formed integral with said head.

4. In a three cylinder fluid pressure engine, having one central and two side cylinders, the combination of the forward head of the central cylinder; a supporting bracket, formed integral with said head; and a lever support, detachably connected to said supporting bracket.

JAMES G. BLUNT.
JOSHUA J. JONES.